United States Patent
Suzuki

(10) Patent No.: US 6,561,536 B2
(45) Date of Patent: May 13, 2003

(54) STROLLER

(75) Inventor: Yoshiyuki Suzuki, Tokyo-To (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 10/073,925

(22) Filed: Feb. 14, 2002

(65) Prior Publication Data

US 2002/0109336 A1 Aug. 15, 2002

(30) Foreign Application Priority Data

Feb. 15, 2001 (JP) ........................................ 2001-038469
Nov. 26, 2001 (JP) ........................................ 2001-359342

(51) Int. Cl.[7] ................................................ B62B 7/08
(52) U.S. Cl. .................... 280/642; 280/647; 280/47.36; 280/47.39
(58) Field of Search ................................ 280/642, 644, 280/643, 647, 650, 657, 658, 47.25, 47.38, 47.39, 47.4; 297/350, 377, 380, 42, 44, 46, 48; 138/88.02, 132, 134, 143

(56) References Cited

U.S. PATENT DOCUMENTS

| | | | | |
|---|---|---|---|---|
| 1,289,965 A | * | 12/1918 | Tichenor ............... | 296/107.02 |
| 4,191,397 A | * | 3/1980 | Kassai .................... | 280/647 |
| 4,378,946 A | * | 4/1983 | Voytko et al. ............... | 280/642 |
| 4,435,012 A | * | 3/1984 | Kassai .................... | 297/354.12 |
| 4,660,850 A | * | 4/1987 | Nakao et al. .............. | 280/642 |
| 4,733,882 A | * | 3/1988 | Kassai .................... | 280/655.1 |
| 4,736,959 A | * | 4/1988 | Van Steenburg ............. | 280/30 |
| 4,828,278 A | * | 5/1989 | Shinroku et al. ........... | 280/644 |
| 4,832,361 A | * | 5/1989 | Nakao et al. ............... | 280/642 |
| 4,889,171 A | * | 12/1989 | Minimo ...................... | 150/166 |
| 4,953,887 A | * | 9/1990 | Takahashi et al. .......... | 280/647 |
| 5,205,308 A | * | 4/1993 | Kendall et al. ............... | 135/90 |
| 5,257,799 A | * | 11/1993 | Cone et al. ................. | 280/642 |
| 5,277,213 A | * | 1/1994 | Mitchell ................... | 297/184.1 |
| 5,472,224 A | * | 12/1995 | Jane Cabagnero ........... | 297/42 |
| 5,562,330 A | * | 10/1996 | Jane Cabagnero ........... | 297/42 |
| 5,752,738 A | * | 5/1998 | Onishi et al. ................. | 297/61 |
| 5,845,924 A | * | 12/1998 | Huang ........................ | 280/642 |
| 6,270,111 B1 | * | 8/2001 | Hanson et al. ............. | 280/650 |
| 6,276,709 B1 | * | 8/2001 | Chen et al. ................. | 280/650 |
| 6,371,553 B1 | * | 4/2002 | Tang ....................... | 297/184.1 |
| 6,464,244 B1 | * | 10/2002 | Cheng ........................ | 280/650 |

* cited by examiner

Primary Examiner—Brian L. Johnson
Assistant Examiner—Bridget Avery
(74) Attorney, Agent, or Firm—Wenderoth, Lind & Ponack, L.L.P.

(57) ABSTRACT

A stroller includes parallel right and left pipes, a pair of armrests each having one end pivotally joined to one of the pipes, a pair of front legs pivotally joined to the armrests, respectively, and provided at the lower ends thereof with front wheels, respectively, a pair of back legs pivotally joined to the armrests, respectively, and provided at the lower ends thereof with back wheels, respectively, and locking members for locking together the back legs and the corresponding pipes. The stroller can be folded in three portions by turning the armrests upward relative to the pipes so that the front legs and the back legs extend substantially in parallel to each other. A substantially U-shaped handle has right and left side parts extended on the outer side of the pipes and is joined pivotally to back leg support members fastened to the lower end parts of the right and the left pipes.

18 Claims, 16 Drawing Sheets

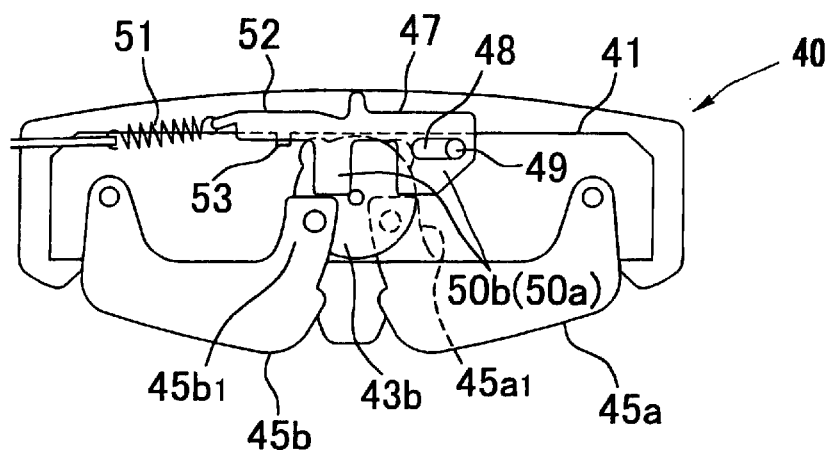
F I G. 9A
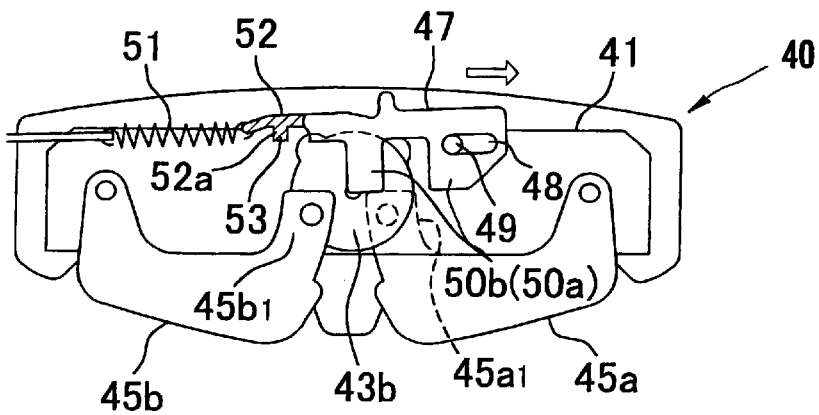
F I G. 9B
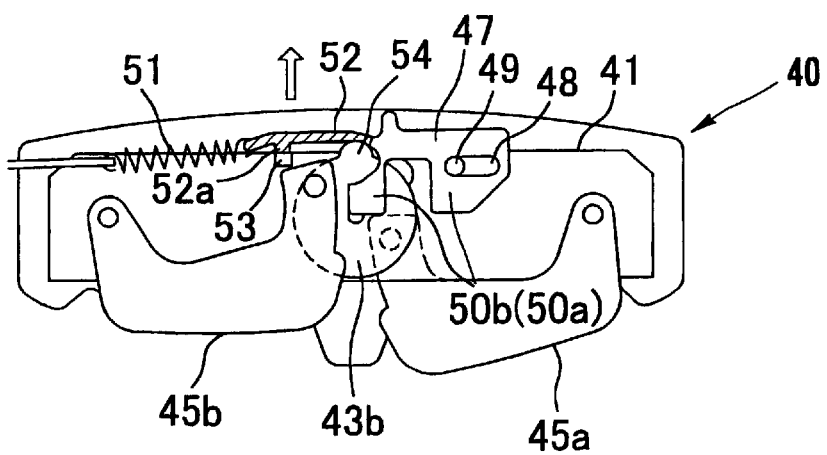
F I G. 9C

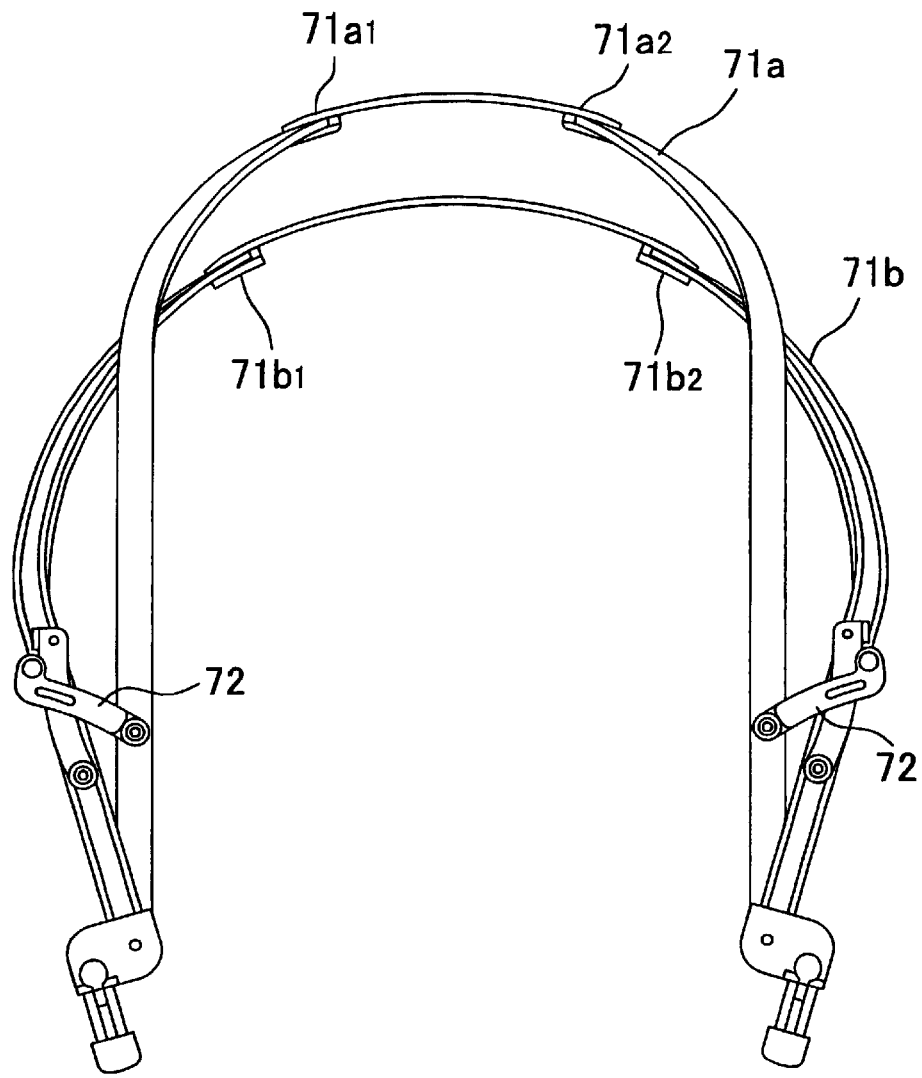
F I G. 14
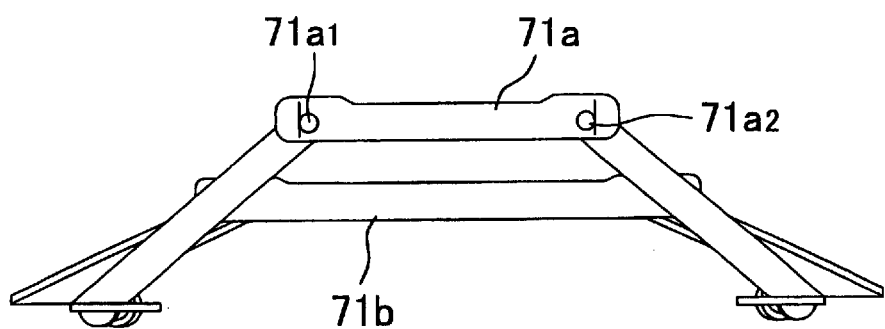
F I G. 15

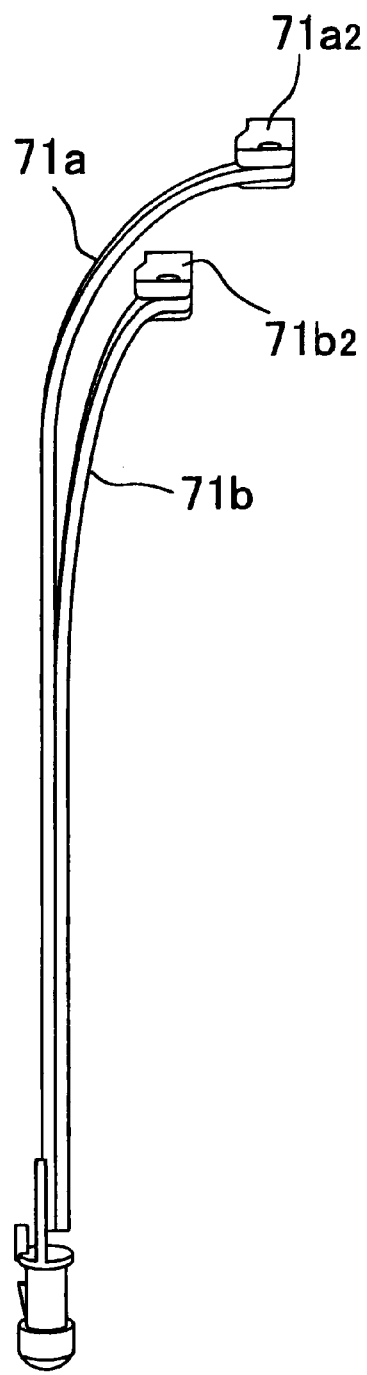
F I G. 16

STROLLER

BACKGROUND OF THE INVENTION

1. Field of the Invention

The present invention relates to a stroller and, more particularly, to a triple-folding stroller.

2. Description of the Related Art

Generally, there have been proposed various folding strollers for carrying a baby outdoors for walking and shopping. Those folding strollers are foldable when necessary to facilitate storing or carrying the same, and are provided with a handle that can be set at a back position or a front position. A person pushing the stroller by the handle faces the back of a baby on the stroller when the handle is set at the back position. A person pushing the stroller by the handle faces the front of a baby on the stroller when the handle is set at the front position.

Some strollers provided with a handle that can be turned simply between a back position on the back side of a seat and a front position on the front side of the seat can be folded in two portions at the most. The size of such a stroller cannot be satisfactorily reduced by folding for storing or the like.

SUMMARY OF THE INVENTION

Accordingly, it is an object of the present invention to proved a stroller including a handle capable of being turned between a front position and a back position, and capable of being folded in three portions.

The present invention provides a stroller including a stroller body and a U-shaped handle connected to the stroller body, wherein the stroller body and the handle can be folded in three portions.

In the stroller according to the present invention, the handle may be capable of being turned relative to the stroller body and of being set at either a back position on the back side of the stroller body or a front position on the front side of the stroller body.

In the stroller according to the present invention, the stroller body may be provided with stopping projections, and the handle may be provided with stopping members capable of being engaged with the stopping projections of the stroller body.

In the stroller according to the present invention, the stopping projections of the stroller body may be positioned such that the stopping members of the handle are engaged with the stopping projections when the handle is set at the front position and are engaged with the stopping projections when the handle is set at the back position.

In the stroller according to the present invention, the stroller body may include a pair of pipes, armrests pivotally joined to the pair of pipes, respectively, front legs pivotally joined to the armrests and provided with front wheels, respectively, and back legs pivotally joined to the armrests and provided with back wheels, respectively, and the back legs may be capable of being locked in place by locking members held on the pipes, respectively.

In the stroller according to the present invention, the armrests may be capable of being turned relative to the pipes when folding the stroller, and the armrests may be provided with latching parts capable of engaging with the stopping members of the handle set at the back position when folding the stroller.

In the stroller according to the present invention, the stopping projections capable of engaging with the stopping members of the handle may be formed on the armrests, and the latching parts may be formed on the free end parts of the stopping projections, respectively.

The stroller according to the present invention may further include a remote-control device held on the handle to operate the stopping members and the locking members.

In the stroller according to the present invention, the remove-control device and the stopping members may be interconnected by wire cables.

The stroller according to the present invention may further include unlocking members held on the handle to operate the locking members of the pipes, wherein the remove-control device and the unlocking members are interlocked by wire cables.

In the stroller according to the present invention, each of the back legs is provided with a back wheel holding pipe disposed with its axis extended in alignment with a vertical line perpendicular to the axis of the back wheel.

The stroller according to the present invention may further include a folding canopy provided with ribs, each rib may be provided with a pair of joints, and each rib may be capable of being folded in three parts at the joints.

In the stroller according to the present invention, each rib is joined pivotally to the stroller body.

The stroller according to the present invention may further include a back rest attached to the stroller body, wherein the backrest may be provided with joints, and the backrest may be folded in three parts at the joints.

In the stroller according to the present invention, the inclination of the backrest relative to the stroller body may be adjustable.

BRIEF DESCRIPTION OF THE DRAWINGS

FIGS. 9A, 9B and 9C are views of assistance in explaining the operation of the remote-control device;

FIG. 14 is a front elevation of the canopy shown in FIG. 13 in a folded state;

FIG. 15 is a top view of the canopy in the state shown in FIG. 14;

FIG. 16 is side elevation of the canopy shown in FIG. 13 in a state where the opposite ends of a rib are set at front positions, respectively;

DESCRIPTION OF THE PREFERRED EMBODIMENTS

Preferred embodiments of the present invention will be described hereinafter with reference to the accompanying drawings.

Figure 1:
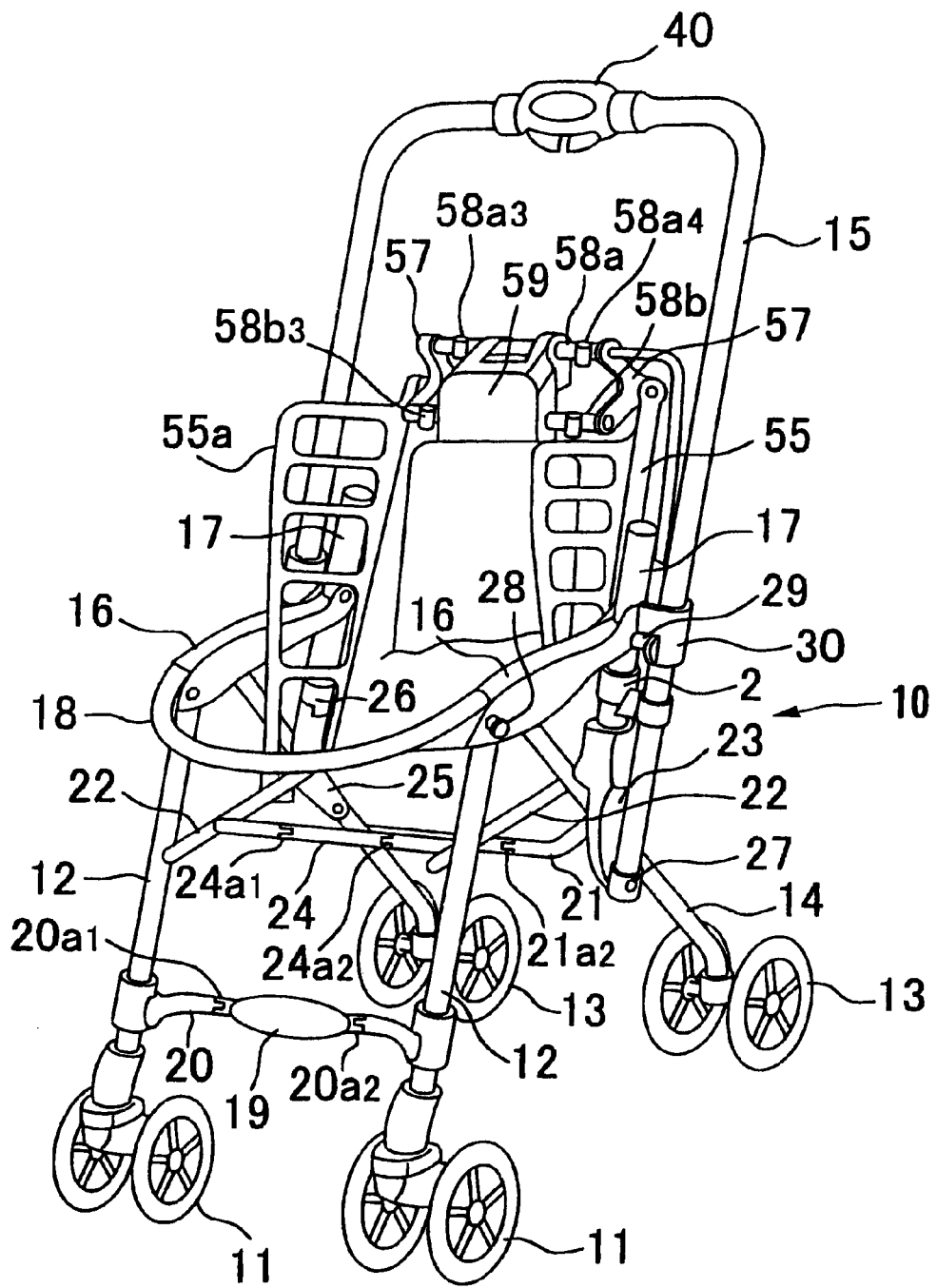
FIG. 1 is a schematic perspective view of a stroller in a preferred embodiment according to the present invention.
Figure 2:
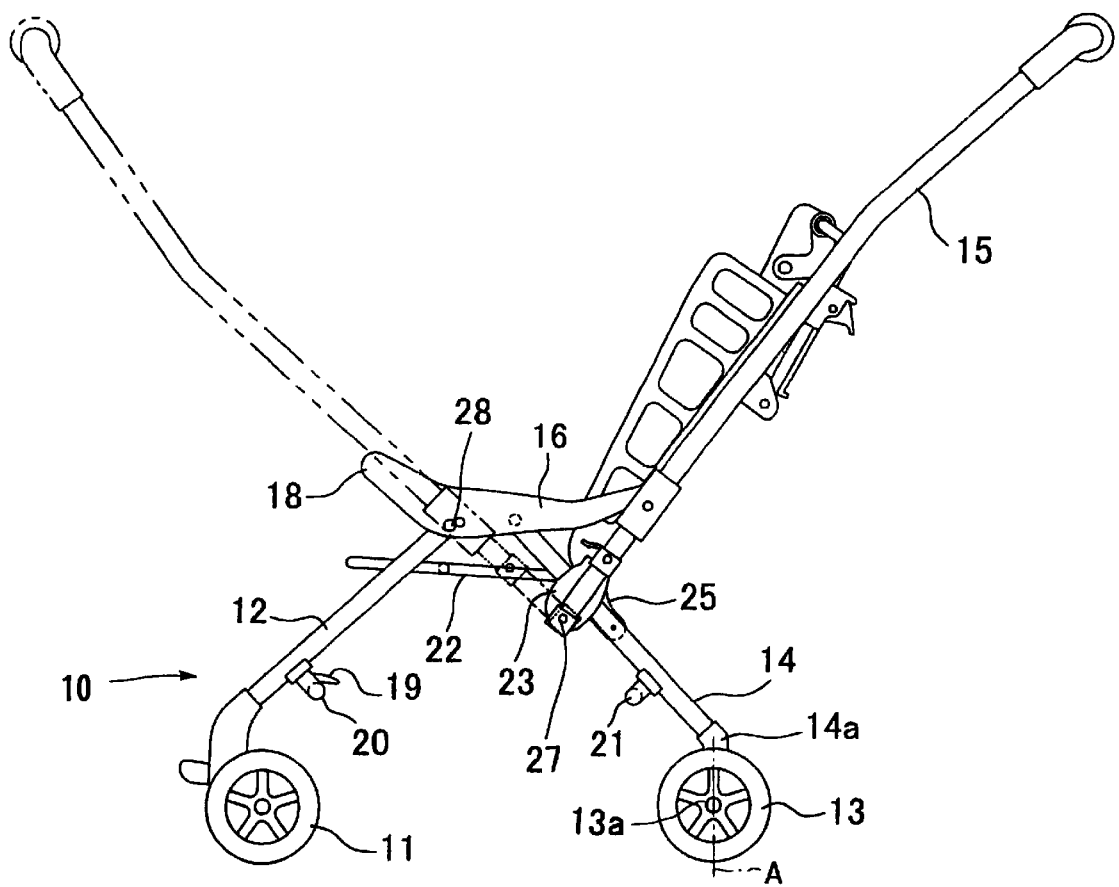
FIG. 2 is a schematic side elevation of the stroller shown in FIG. 1.

FIGS. 1 and 2 are a schematic perspective view and a schematic side elevation, respectively, of a stroller in a preferred embodiment according to the present invention. Referring to FIGS. 1 and 2, the stroller includes a pair of front legs 12 respectively provided with front wheels 11, a pair of back legs 14 respectively provided with back wheels 13, a substantially U-shaped handle 15, a pair of armrests 16, and parallel right and left pipes 17 pivotally joined to the back ends of the arm rests 16, respectively.

The front legs 12 are pivotally joined to the front ends of the arm rests 16, respectively. An arcuate, flexible guard arm 18 is extended across and detachably joined to the front ends of the arm rest 16. The upper ends of the back legs 14 are joined pivotally to the armrests 16, respectively. A front connecting bar 20 provided with a footrest 19 is extended between the front legs 12. A back connecting bar 21 is extended between the back legs 14. Connecting bars 22 have front ends pivotally joined to middle parts of the front legs 12, respectively, and back ends pivotally joined to back leg support members 23 fastened to lower parts of the pipes 17. An upper connecting bar 24 interconnects the right and the left connecting bars 22. The front legs 12 provided with the front wheels 11, the back legs 14 provided with the back wheels 13, the armrests 16, the pipes 17 and the connecting bars constitute a stroller body 10. The handle 15 is joined pivotally to the stroller body 10.

Figure 3:
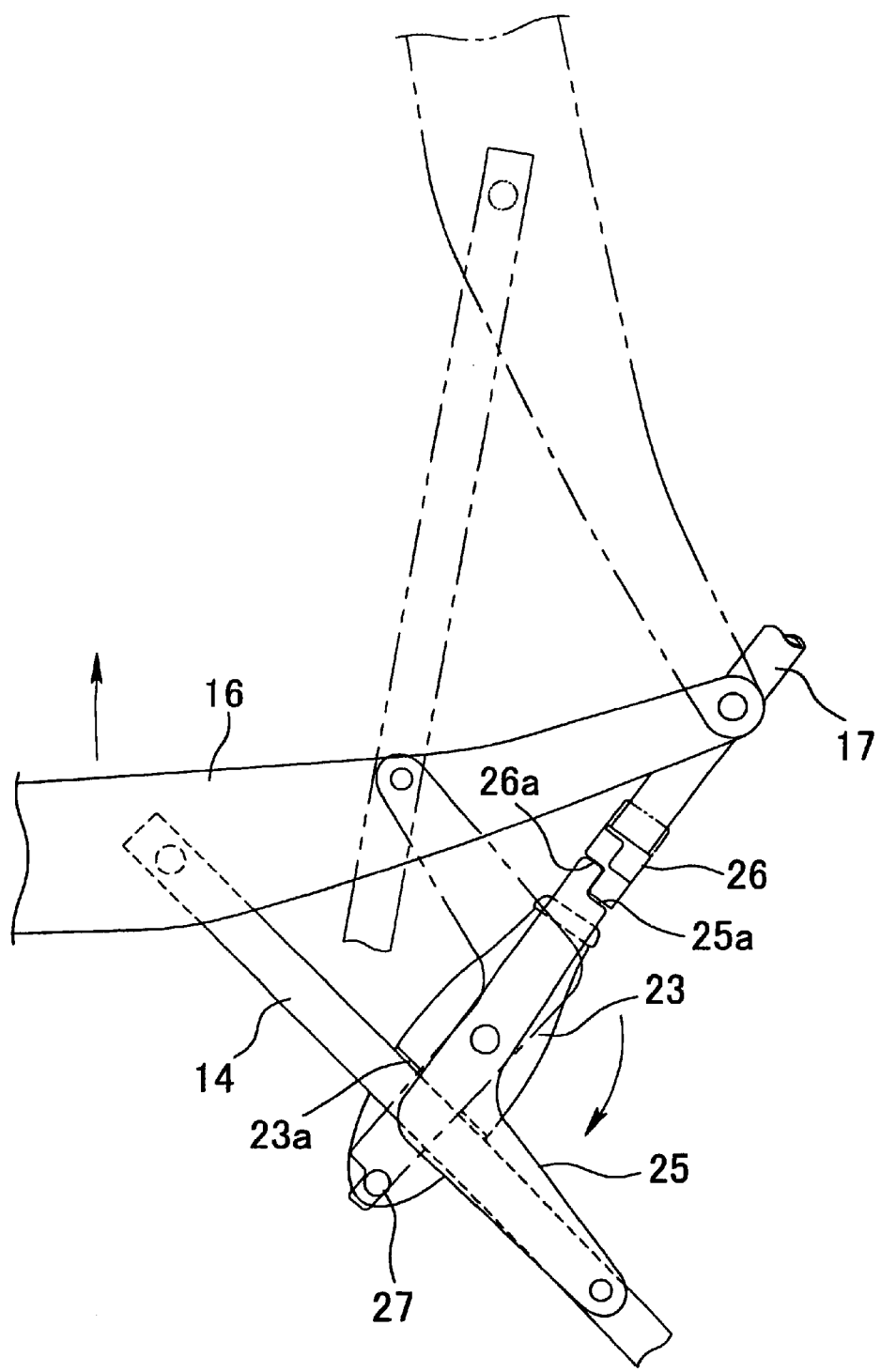
FIG. 3 is an enlarged side elevation of a part of the stroller around the joint of a pipe and a back leg.

Referring to FIG. 3, an L-shaped bracket 25 has a lower end part pivotally joined to the back leg 14, and a middle part pivotally joined to the back leg support member 23. A stepped part 25a is formed in a free end part of the bracket 25. The stepped part 25a is engaged with a stepped part 26a formed in a locking member 26 for locking together the back leg 14 and the pipe 17. The locking member 26 is put slidably on the pipe 17 and is moved along the pipe 17 by a remote-control device 40, which will be described later. The back leg support member 23 is provided with a stepped part 23a. The stepped part 23a is pressed against the back leg 14 when the stroller is unfolded to hold the back leg 14 in an unfolded state.

When the locking member 26 is engaged with the stepped part 25a of the L-shaped bracket 25 as shown in FIG. 3, the bracket 25 locks the back leg 14 and the pipe 17 together to hold the stroller in the unfolded state for use. When the locking member 26 is raised to a position indicated by two-dot chain lines by the remote-control device 40, the armrest 16, the front leg 12 and the back leg 14 can be turned to positions indicated by two-dot chain lines, so that the stroller can be folded in two portions to facilitate carrying the same.

Figure 4:
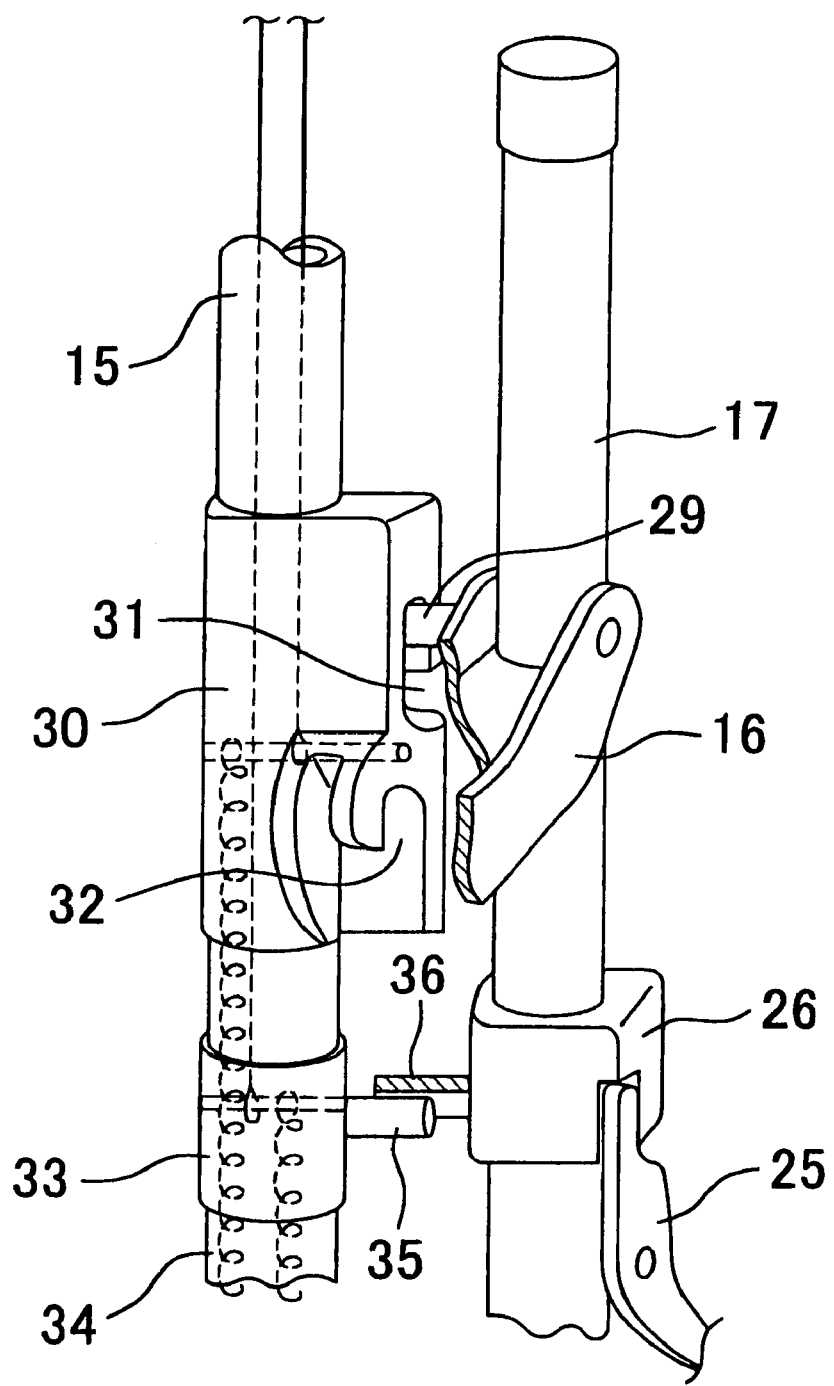
FIG. 4 is a fragmentary perspective view of a stopping member held on a handle, and an unlocking member.
Figure 5:
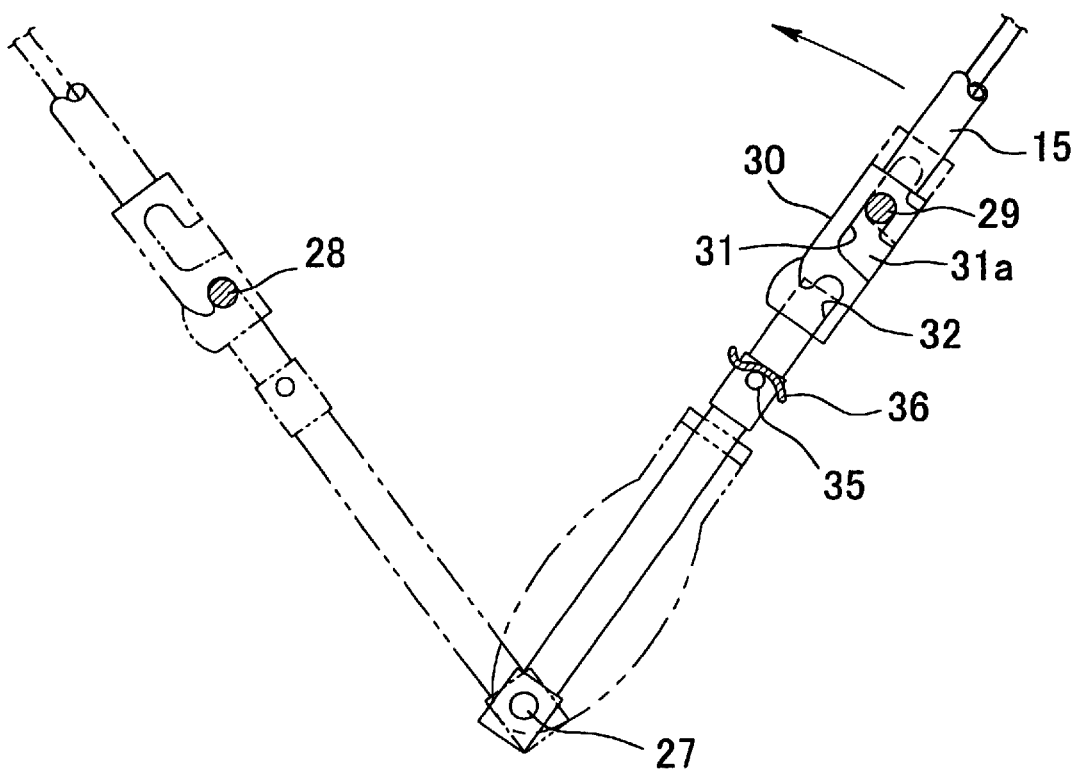
FIG. 5 is a side elevation of assistance in explaining an operation for turning the handle.

As shown in FIGS. 1 and 2, lower end parts of the U-shaped handle 15 are joined pivotally to the back leg support members 23 fastened to the lower end parts of the right and the left pipes 17 such that the handle 15 can be turned between a front position and a back position on a shaft 27. A front stopping projection 28 and a back stopping projection 29 are attached to front and back end parts, respectively, of the outer side surface of each armrest 16 so as to project laterally. As shown in FIGS. 4 and 5, stopping members 30 are put on the handle 15 so as to be slidable on the handle 15. The stopping members 30 engage with the stopping projections 28 or 29, respectively. The stopping members 30 are biased downward by a spring.

Figure 6:
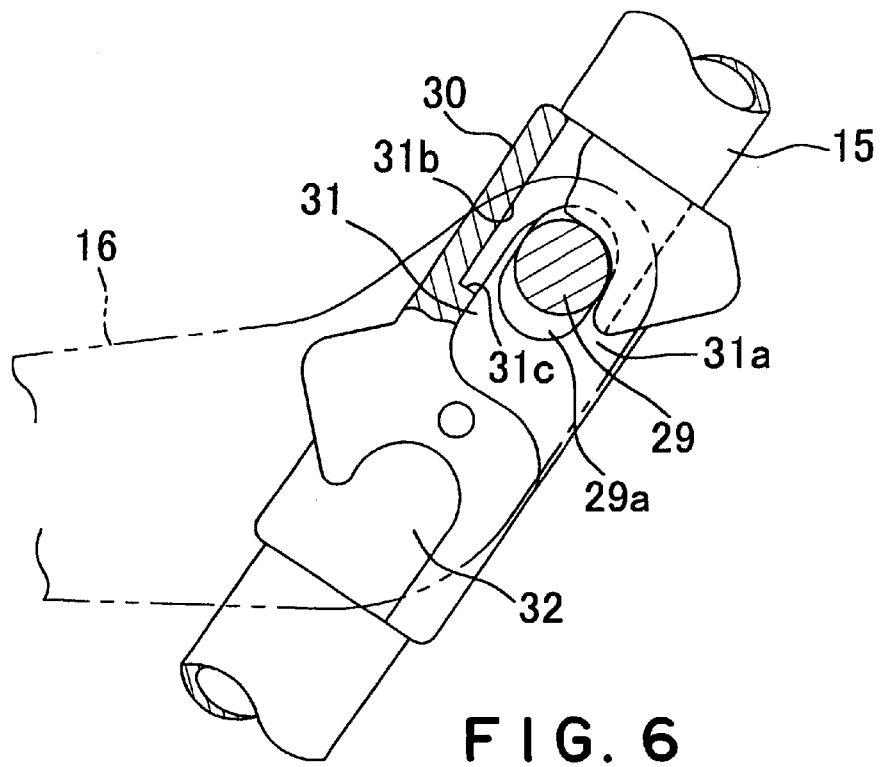
FIG. 6 is a fragmentary, enlarged, partly sectional view of the stopping member and a stopping projection in engagement with the stopping member.

The front stopping projection 28 is cylindrical. As shown in FIG. 6, the back stopping projection 29 has an elliptic end part (latching part) 29a having a major axis parallel to the axis of the handle 15 and tilted toward the back. As shown in FIG. 5, the stopping member 30 is provided on the side facing the pipe 17 with an L-shaped, first catching groove 31. The first catching groove 31 has a longitudinal section extending in parallel to the axis of the handle 15, and a lower open end 31a opening toward the back. A longitudinal second catching groove 32 is formed in a part of the stopping member 30 below the first catching groove 31. The second catching groove 32 opens forward and downward. As shown in FIG. 6, a recess 31b of a shape that permits the elliptic end part 29a of the stopping projection 29 to turn therein is formed on the side of the inner surface of the longitudinal section of the first catching groove 31. A stepped part 31c is formed in a lower part of a front wall defining the recess 31b.

The stopping member 30 is pulled upward by the remote-control device 40 and the handle 15 is turned to the back position to receive the back stopping projection 29 through the open end 31a of the first catching groove 31 opening toward the back. Then, the stopping member 30 is moved downward to engage the back stopping projection 29 in the first catching groove 31. Consequently, the handle 15 is fixedly held at the back position as indicated by continuous lines in FIG. 2. When the stopping member 30 is pulled upward as indicated by two-dot chain lines, the handle 15 is turned to the front position. Then the front stopping projection 28 is received in the second catching groove 32, and the stopping member 30 is moved downward. As a result the handle 15 is held fixedly at the front position as indicated by two-dot chain lines in FIGS. 2 and 5.

Figure 7:
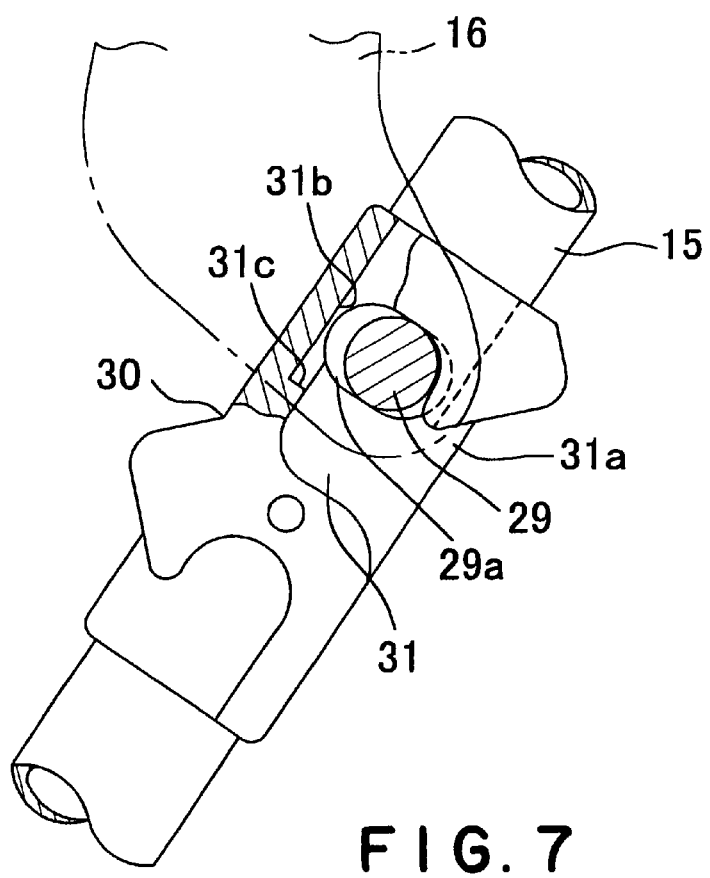
FIG. 7 is a fragmentary, enlarged partly sectional view of the stopping member and the stopping projection in a state where an armrest is turned to its upper position.

When each armrest 16 is turned upward to fold the stroller, the elliptic end part 29a of the back stopping projection 29 fixed to the armrest 16 turns in the recess 31b as shown in FIG. 7. Therefore, even if the remote-control device 40 is operated wrongly to pull up the stopping member 30 in a state where the stroller is folded, the elliptic end part 29a engages with the stepped part 31c to restrain the stopping member 30 from upward movement. Thus, stroller is prevented from being accidentally unfolded due to the wrong upward movement of the stopping member 30.

Referring to FIG. 2, a vertical axis A perpendicular to the axis of an axle 13a supporting the back wheel 13 is aligned with the axis of a back wheel holding pipe 14a holding the back wheel 13 of the back leg 14. Therefore, the stroller can be stably controlled and is able to travel smoothly even when the handle 15 is set at the front position and the stroller is pushed so that the back wheels 13 lead the front wheels 11.

Referring to FIG. 4, an unlocking member 33 is provided on a part of the handle 15 extending below the stopping member 30 so as to be operated by the remote-control device 40 for sliding motion along the handle 15. The unlocking member 33 is biased downward by a spring 34 extended in the handle 15. An unlocking rod 35 projects outside from the unlocking member 33. An operating plate 36 projects outside from the locking member 26 so as to extend above the unlocking rod 35. When the unlocking member 33 provided with the unlocking rod 35 is pulled upward, the unlocking rod 35 comes into engagement with the operating plate 36 and pushes the locking member 26 up to release the bracket 25.

Figure 8:
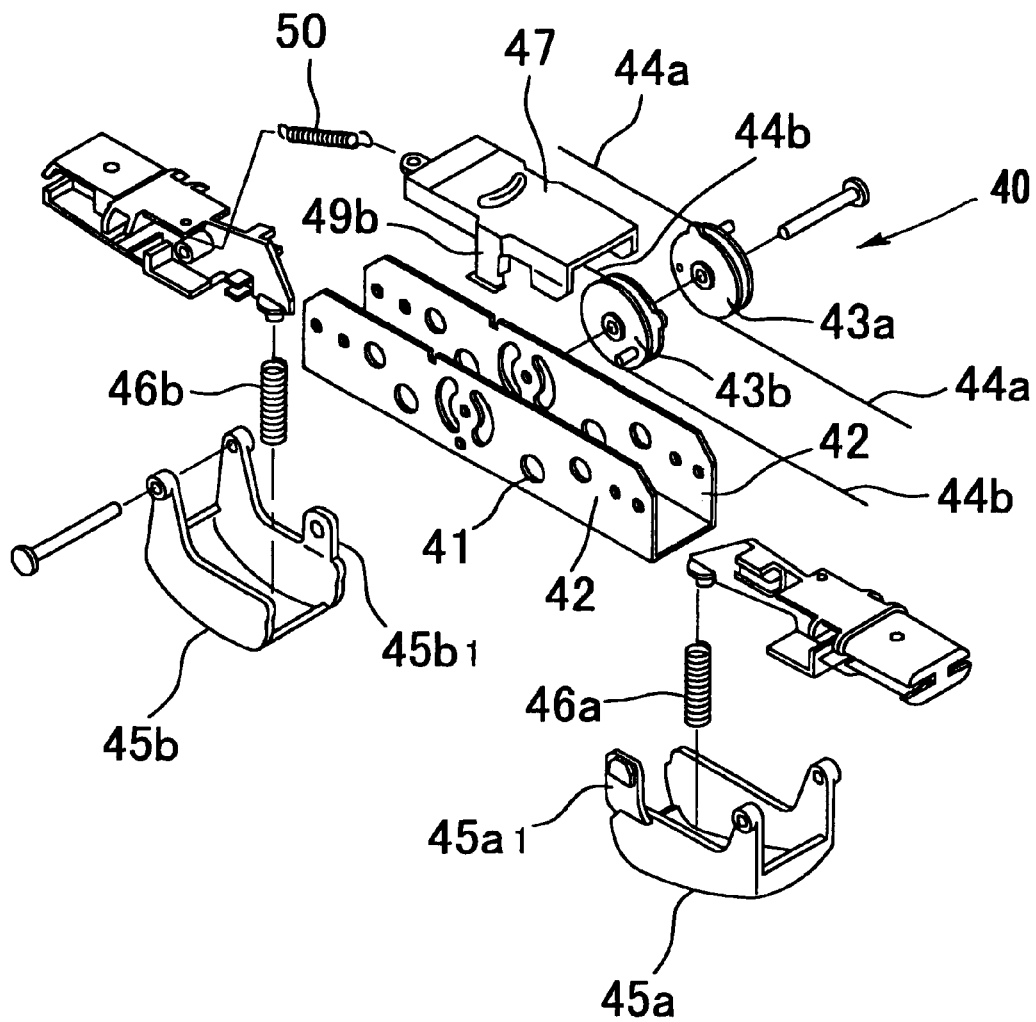
FIG. 8 is an exploded perspective view of a remote-control mechanism included in a remote-control device.

The remote-control device 40 is held on a middle part of the horizontal part of the handle 15. Right and left parts of the handle 15 are joined to the opposite ends of the remote-control device 40 by joints, not shown, respectively, so that the right and the left parts can be turned toward the front. Referring to FIG. 8 showing an operating mechanism included in the remote-control device 40 in an exploded perspective view. A frame 41 having the shape of a channel is connected to the handle 15 by the joints. The frame 41 has opposite side walls 42. Two pulleys 43a and 43b are disposed between and held for rotation on the side walls 42. Wire cables 44a are connected to diametrically opposite parts of the pulley 43a, respectively, and wire cables 44b are connected to diametrically opposite parts of the pulley 43b, respectively. The wire cables 44a and 44b are extended through the handle 15. The wire cables 44a connected to the pulley 43a are connected to the stopping members 30, respectively. The wire cables 44b connected to the pulley 43b are connected to the unlocking members 33, respectively.

Operating levers 45a and 45b of a U-shaped cross section have base ends pivotally connected to the frame 41. The operating levers 45a and 45b are biased so that ends thereof project from the frame 41 by springs 46a and 46b, respectively. The operating levers 45a and 45b have driving projections 45a1 and 45b1 connected to the pulleys 43a and 43b, respectively. A locking plate 47 is provided on the frame 41 so as to slide along the upper edge's of the side walls 42 of the frame 41. As shown in FIGS. 9A to 9C, a guide slot 48 is formed in an end part of the locking plate 47 and a stopping pin 49 is engaged in the guide slot 48 to limit the range of movement of the locking plate 47. The opposite side walls of the locking plate 47 are provided with restricting parts 50a and 50b, respectively. The restricting parts 50a and 50b are able to come into engagement with upper ends of the driving projections 45a1 and 45b1, respectively.

In a state shown in FIG. 9A, the locking plate 47 is biased by a return spring 51 in a restricting direction, and the lower end parts of the restricting parts 50a and 50b are at operating positions on the upper ends of the driving projections 45a1 and 45b1 of the operating levers 45a and 45b, respectively, to exercise a locking function. In this state, the driving projections 45a1 and 45b1 cannot be raised even if an operating force is applied to the operating levers 45a and 45b, so that the safety of the remote-control device is assured.

When the locking plate 47 is moved in the direction of the arrow as shown in FIG. 9B, the restricting parts 50a and 50b are shifted from the positions on the upper ends of the driving projections 45a1 and 45b1 of the operating levers 45a and 45b to neutral positions, respectively. Thus, the restricting parts 50a and 50b are moved away from the driving projections 45a1 and 45b1.

A base end part of the locking plate 47 is biased downward by the return spring 51. Therefore, a stopping projection 52a formed on the top wall 52 of the operating plate 47 is engaged in grooves 53 formed in the upper edges of the frame 41 to hold the locking plate 47 temporarily at an open position when the locking plate 47 is moved in the direction of the arrow as shown in FIG. 9B.

Referring to FIG. 9C, when the operating lever 45a or 45b of the remote-control device 40 in the state shown in FIG. 9B is operated to raise the driving projection 45a1 or 45b1, the pulley 43a or 43b is turned to pull the wire cables 44a or 44b for remote-control operation.

When the pulley 43a or 43b is thus turned, a projection 54 projecting from the circumference of the pulley 43a or 43b engages with the top wall 52 of the locking plate 47 to raise the operating plate 47. Consequently, the stopping projection 52a is disengaged from the grooves 53. Therefore, when the force applied to the operating lever 45a or 45b is removed from the operating lever 45a or 45b, the locking plate 47 is returned automatically and instantly to its initial position to prevent the accidental operation of the remote-control device 40.

Figure 10:
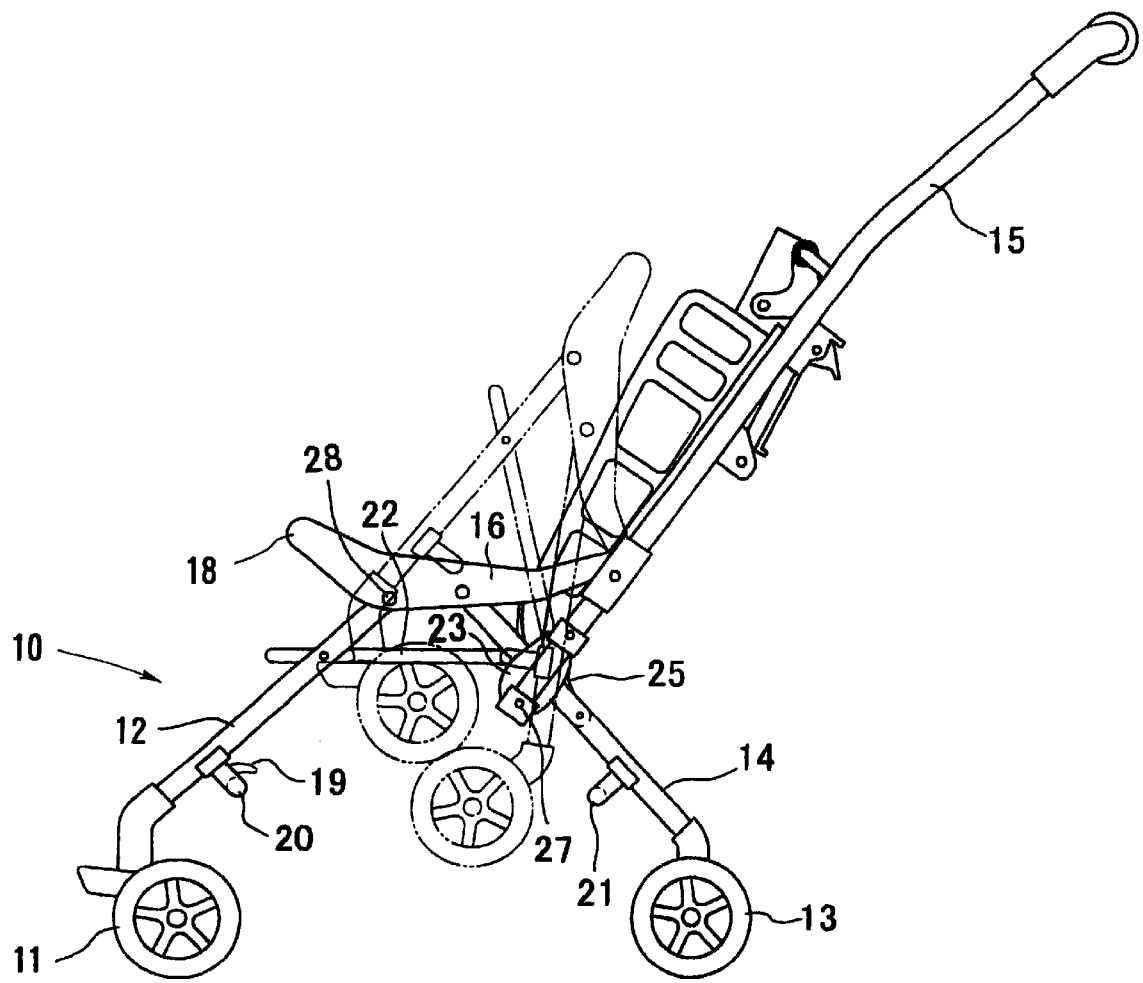
FIG. 10 is side elevation of the stroller shown in FIG. 1 folded in two portions.

The wire cables 44a pull the stopping members 30 against the resilience of springs to unlock the handle 15 when the operating lever 45a is operated. Consequently, the handle 15 can be turned forward to the front position or backward to the back position. The wire cables 44b pull the unlocking members 33 to pull up the locking members 26 through the unlocking rods 35 and the operating plates 36 when the operating lever 45b is operated. Consequently, the armrests 16, the front legs 12 and the back legs 14 can be folded to folded positions indicated by two-dot chain lines in FIG. 10.

Figure 11:
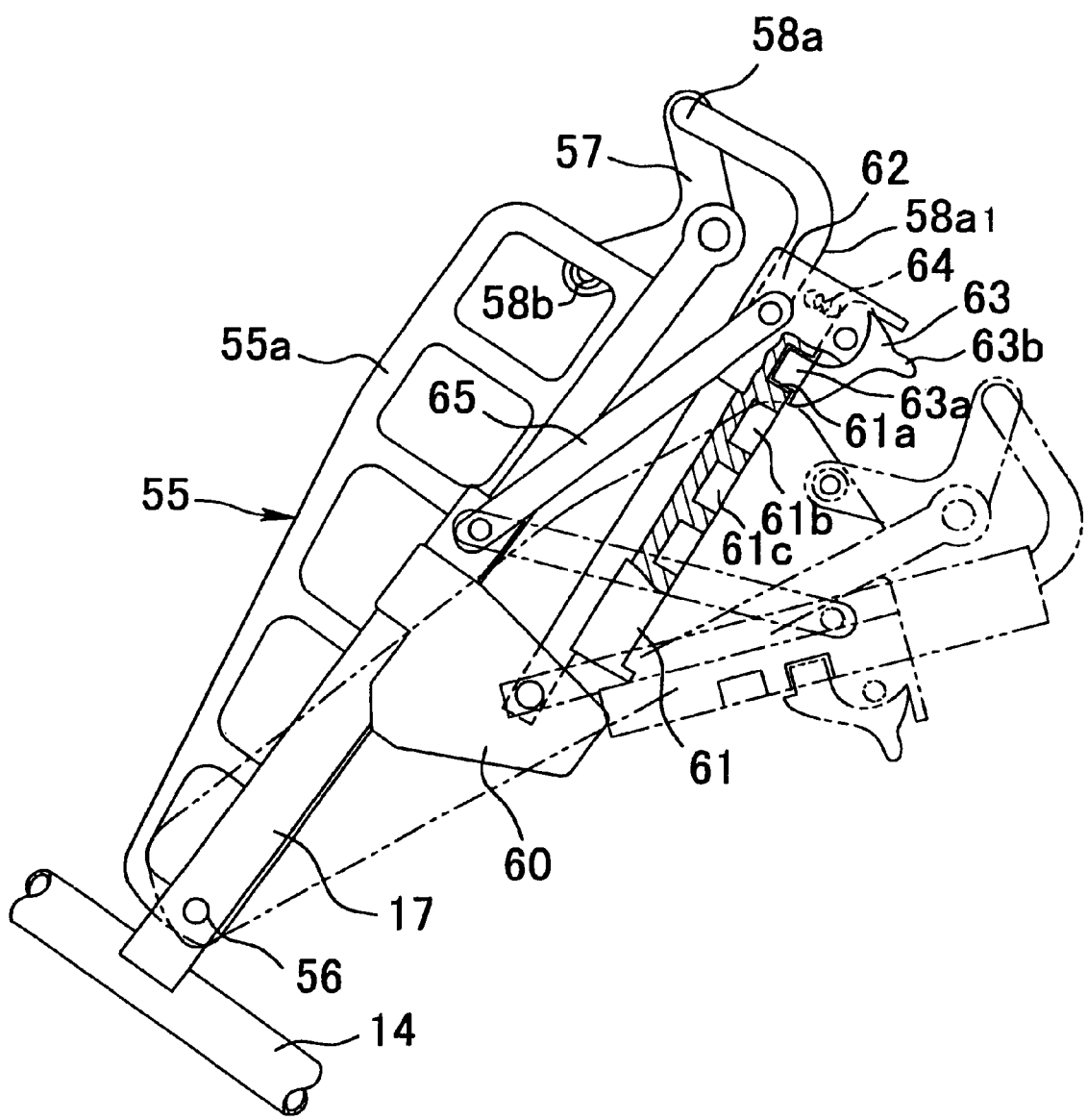
FIG. 11 is a side elevation of a backrest.

Referring to FIGS. 1 and 11, a backrest 55 is extended between the right and the left pipes 17 to support a baby by the back. Side guards 55a are formed integrally with right and left side parts of the backrest 55. A lower end part of the backrest 55 is supported pivotally on the right and the left pipes 17 by a shaft 56. Middle parts of V-shaped links 57 are pivotally supported on an upper right-hand part and an upper left-hand part of the backrest 55, respectively. Headrest support rods 58a and 58b supporting the headrest 55 and extended between the links 57, are joined pivotally to upper end parts and lower end parts, respectively, of the links 57.

The headrest support rod 58a has straight parts 58a1 respectively extending along the right and the left sides of the backrest 55. End parts of the straight parts 58a1 are joined pivotally to brackets 60, which are fixed to the pipes 17 and projecting downward, respectively. A positioning member 61 provided with a plurality of holes 61a, 61b and 61c is extended along and fixed to the back side of each straight part 58a1. An inclination adjusting member 62 is slidably fitted on the straight part 58a1 and the positioning member 61. An operating lever 63 provided with a locking projection 63a and an operating lug 63b is pivotally joined to the inclination adjusting member 62. The operating lever 63 is biased by a spring 64 in a direction to engage the locking projection 63a in one of the holes 61a, 61b and 61c. A link 65 has one end pivotally joined to the inclination adjusting member 62 and the other end pivotally joined to the pipe 17.

The locking projection 63a of the operating lever 63 is engaged in the hole 61a to fix the backrest 55. When the operating lugs 63b are operated to disengage the locking projections 63a from the holes 61a, the inclination adjusting members 62 are moved along the straight parts 58a1 of the headrest support rod 58a, and the locking projections 63a are engaged in, for example, the holes 61c, the backrest 55 is turned to a position indicated by two-dot chain lines in FIG. 11 for inclination adjustment.

The front connecting bar 20, the back connecting bar 21, the upper connecting bar 24, and the headrest support rods 58a and 58b are provided with joints 20a1 and 20a2, joints 21a1 and 21a2, joints 24a1 and 24a2, joints 58a3 and 58a4, and joints 58b3 and 58b4, respectively, to make the front connecting bar 20, the back connecting bar 21, the upper connecting bar 24, and the headrest support rods 58a and 58b foldable. The respective axes of the joints 20a1, 21a1, 24a1, 58a3, 58b4 and one of the joints of the handle 15 are parallel and aligned with an axis, and the respective axes of the joints 20a2, 21a2, 24a2, 58a4, 58b4 and the other joint of the handle 15 are parallel and aligned with an axis when the stroller is folded such that the front legs 12 and the back legs 14 extend in parallel to each other.

Figure 12:
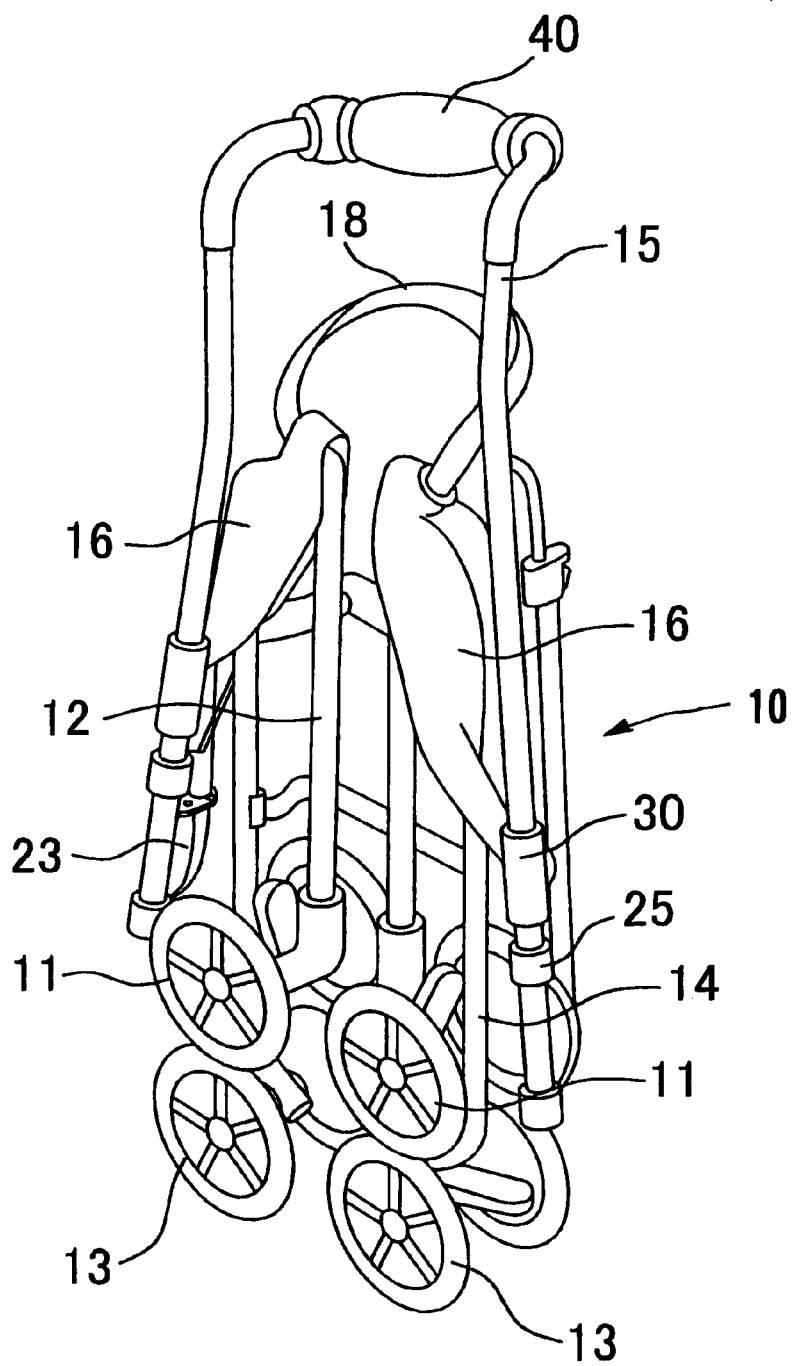
FIG. 12 is a perspective view of the stroller shown in FIG. 1 folded in three portions.

When the stroller is folded such that the front legs 12 and the back legs 14 extend in parallel to each other, and the outer parts of the handle 15 on the outer side of the joints are moved forward, the outer parts of the handle 15, the front connecting bar 20, the back connecting bar 21, and the headrest support rods 58a and 58b are turned forward on the joints. Thus, the stroller can be folded in three portions as shown in FIG. 12.

Figure 13:
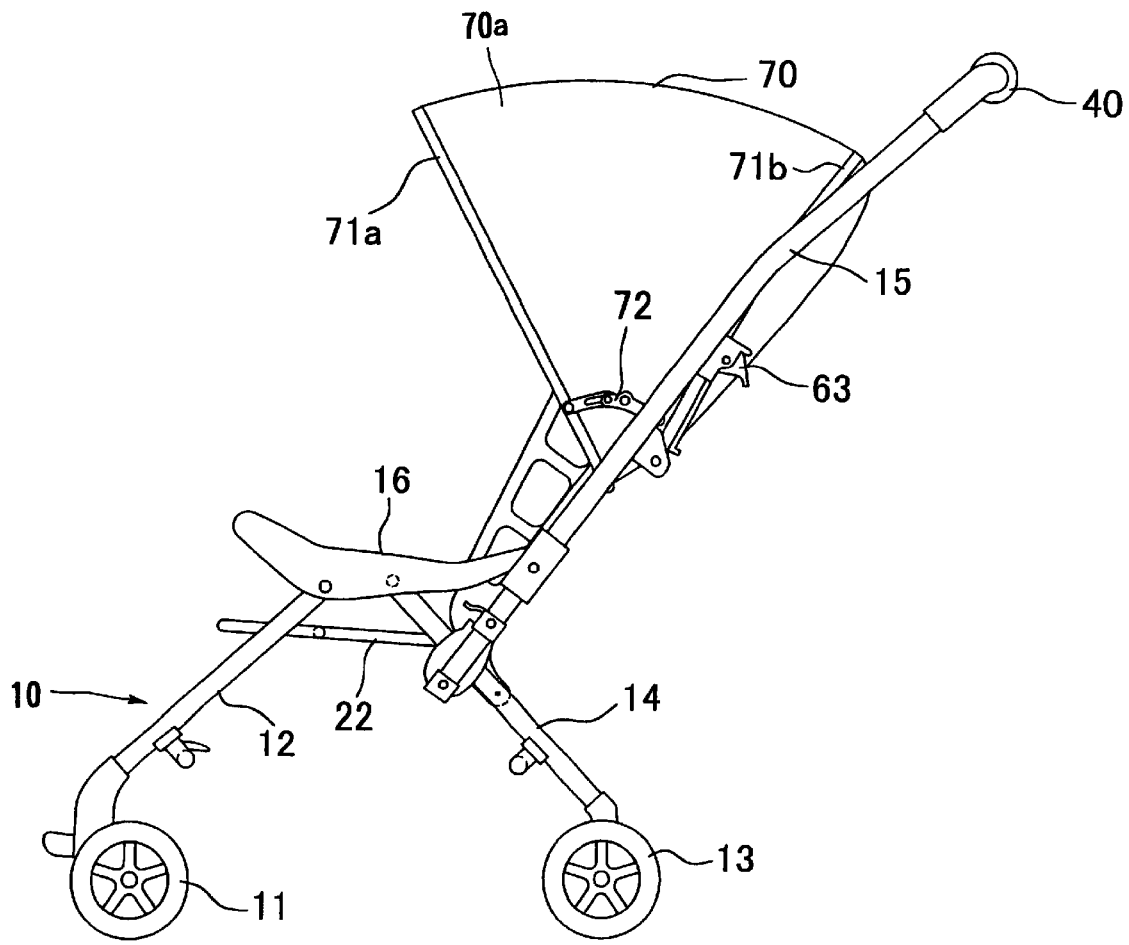
FIG. 13 is a side elevation of the stroller shown in FIG. 1 provided with a canopy.

Referring to FIG. 13, a shading canopy 70 is attached to the stroller when necessary. The shading canopy 70 has two ribs 71a and 71b each having a shape resembling the inverted letter U. The ribs 71a and 71b have base end parts pivotally joined together. A hood 70a is extended between the ribs 71a and 71b. Right and left lower end parts of the ribs 71a and 71b are pivotally joined to canopy support members 72, respectively. A support rod 73 projects from each canopy support member 72. The support rods 73 of the canopy support members 72 are fixed to canopy brackets fixed to the pipes 17 to hold the shading canopy 70 on the stroller. The ribs 71a and 71b each having the shape resembling the inverted letter U are turned toward each other to fold the shading canopy 70 as shown in FIG. 14. The ribs 71a and 71b are opened by turning the same away from each other so that the legs of the same divert from each other in a shape resembling the letter V to develop the shading canopy 70, and the ribs 71a and 71b are held in the open state by stays 74 to keep the shading canopy 70 in a working state. The rib 71a has a horizontal middle section and side sections pivotally joined to the opposite ends of the middle section by two joints 71a1 and 71a2, respectively. The rib 71b has a horizontal middle section and side sections pivotally joined to the opposite ends of the middle section by two joints 71b1 and 71b2, respectively. When folding the stroller in three portions, the ribs 71a and 71b can be folded in three portions as shown in FIGS. 15 and 16 by turning the side sections on the joints 71a1 and 71a2, and joints 71b1 and 71b2, respectively. Thus, the stroller provided with the shading canopy 70 can be folded in a compact arrangement without removing the shading canopy 70.

Figure 17:
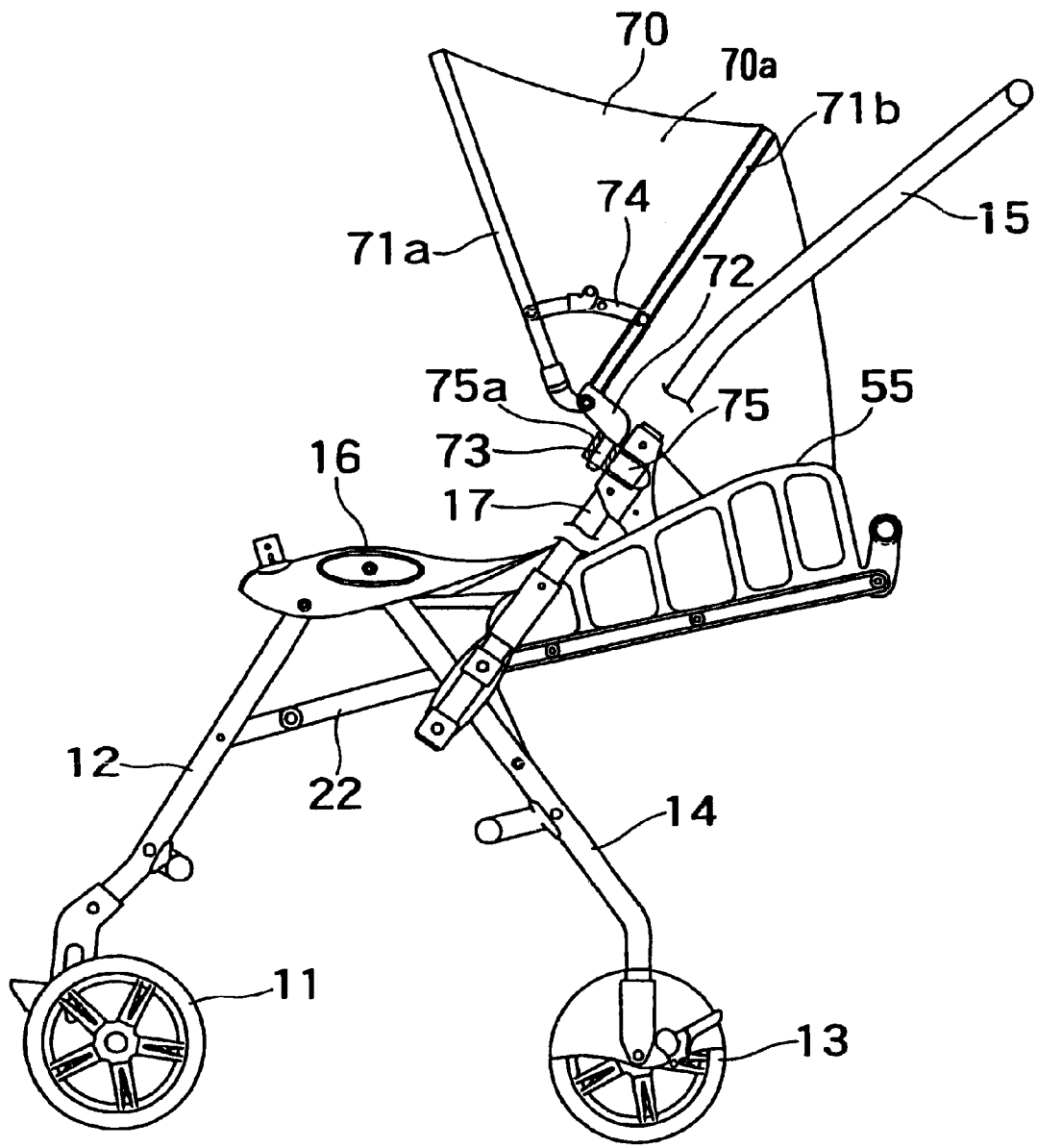
FIG. 17 is a side elevation of another canopy holding part according to the present invention.

FIG. 17 shows a shading canopy 70 in another embodiment according to the present invention for the stroller shown in FIG. 1. A canopy holding member 75 having a cylindrical part 75a is fixed to each of the pipes 17 pivotally supporting the armrests 16 such that the cylindrical part 75a extends in parallel to the axis of the pipe 17. The cylindrical part 75a lies on the front side of the pipe 17 when the stroller is unfolded. A support rod 73 projecting from a canopy support member 72 included in the shading canopy 70 is fitted in the cylindrical part 75a so as to be turnable about its axis.

Figure 18:
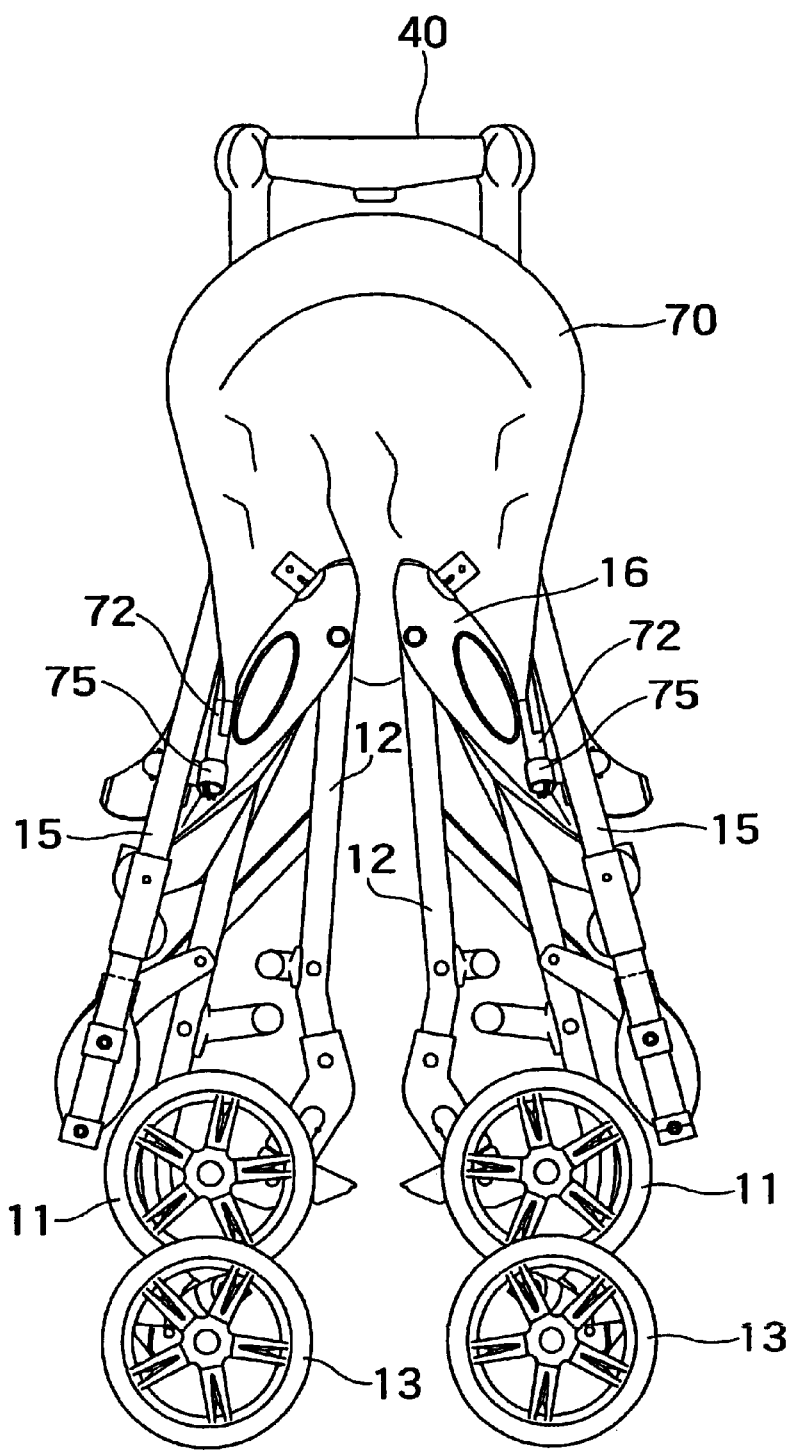
FIG. 18 is a front elevation of the stroller shown in FIG. 17 folded in three portions.

When folding the stroller provided with the shading canopy 70 in three portions, the stroller is folded in three portions, and then the outer sections of the handle 15 on the outer side of the joints are turned forward on the joints together with the pipes 17. Consequently, the cylindrical parts 75a of the canopy holding members 75 are turned together with the pipes 17 to be positioned on the inner side of the pipes 17, respectively. Since the support rods 73 projecting from the canopy support members 72 are fitted in the cylindrical parts 75a so as to be turnable about their axes, the cylindrical parts 75a turn relative to the support rods 73 and hence the shading canopy 70 is prevented from obstructing folding the stroller in three portions as shown in FIG. 18.

As apparent from the foregoing description, according to the present invention, the substantially U-shaped handle is joined pivotally to the stroller body capable of being folded in three portions so as to be turned between the front and the back position. Therefore, the user is able to push the stroller either facing the front of the baby in the stroller or facing the back of the baby in the stroller, and the stroller can be folded in three portions in a compact arrangement for storing or carrying.

What is claimed is:

1. A stroller comprising:
    a stroller body including a pair of pipes, a plurality of armrests including latching parts, said armrests being pivotally joined to said pair of pipes, respectively, a plurality of front legs having front wheels, said front legs being pivotally joined to said armrests, respectively, and a plurality of back legs having back wheels, said back legs being pivotally joined to said armrests, respectively, a plurality of stopping projections, and a plurality of locking members located on said pair of pipes, respectively, said locking members being capable of locking said back legs in place; and
    a U-shaped handle connected to said stroller body and having a plurality of stopping members capable of being engaged with said stopping projections of the stroller body, wherein
        said U-shaped handle is capable of being turned relative to said stroller body and set at either a back position on a back side of said stroller body or a front position on a front side of said stroller body,
        said stopping projections of said stroller body are positioned such that said stopping members of said U-shaped handle are engaged with said stopping projections when said U-shaped handle is set at the front position and is engaged with said stopping projections when said U-shaped handle is set at the back position,
        said stroller body and said U-shaped handle can be folded in three portions,
        said armrests are capable of being turned relative to said pair of pipes when folding said stroller, and
        said latching parts are capable of engaging with said stopping members of said U-shaped handle set at the back position when folding said stroller.

2. The stroller according to claim 1, wherein said stopping projections capable of engaging with said stopping members of said U-shaped handle are formed on said armrests, and said latching parts are formed on free end parts of said stopping projections, respectively.

3. The stroller according to claim 1, further comprising a folding canopy provided with a plurality of ribs, wherein each of said ribs is provided with a pair of joints, and each of said ribs is capable of being folded in three portions at said joints.

4. The stroller according to claim 1, further comprising a backrest attached to said stroller body, wherein said backrest is provided with a plurality of joints, and said backrest can be folded in three portions at said joints.

5. The stroller according to claim 3, wherein each of said ribs is joined pivotally to said stroller body.

6. The stroller according to claim 4, wherein
an inclination of said backrest is adjustable relative to said stroller body.

7. A stroller comprising:
a stroller body including a pair of pipes, a plurality of armrests pivotally joined to said pair of pipes, respectively, a plurality of front legs having front wheels, said front legs being pivotally joined to said armrests, respectively, and a plurality of back legs having back wheels, said back legs being pivotally joined to said armrests, respectively, a plurality of stopping projections, and a plurality of locking members located on said pair of pipes, respectively, said locking members being capable of locking said back legs in place;
a U-shaped handle connected to said stroller body and having a plurality of stopping members capable of being engaged with said stopping projections of the stroller body; and
a remote-control device located on said U-shaped handle to operate said stopping members and said locking members, wherein
said U-shaped handle is capable of being turned relative to said stroller body and set at either a back position on a back side of said stroller body or a front position on a front side of said stroller body,
said stopping projections of said stroller body are positioned such that said stopping members of said U-shaped handle are engaged with said stopping projections when said U-shaped handle is set at the front position and is engaged with said stopping projections when said U-shaped handle is set at the back position, and
said stroller body and said U-shaped handle can be folded in three portions.

8. The stroller according to claim 7, wherein
said remote-control device and said stopping members are interconnected by wire cables.

9. The stroller according to claim 7, further comprising
a plurality of unlocking members located on said U-shaped handle to operate said locking members of said pair of pipes, wherein
said remote-control device and said unlocking members are interlocked by wire cables.

10. The stroller according to claim 7, further comprising
a folding canopy provided with a plurality of ribs, wherein
each of said ribs is provided with a pair of joints, and each of said ribs is capable of being folded in three portions at said joints.

11. The stroller according to claim 7, further comprising
a backrest attached to said stroller body, wherein
said backrest is provided with a plurality of joints, and said backrest can be folded in three portions at said joints.

12. The stroller according to claim 10, wherein
each of said ribs is joined pivotally to said stroller body.

13. The stroller according to claim 11, wherein
an inclination of said backrest is adjustable relative to said stroller body.

14. A stroller comprising:
a stroller body including a pair of pipes, a plurality of armrests pivotally joined to said pair of pipes, respectively, a plurality of front legs having front wheels, said front legs being pivotally joined to said armrests, respectively, a plurality of back legs having back wheels and each of said back legs including a back wheel holding pipe having an axis extended in alignment with a vertical line perpendicular to an axis of said back wheels, said back legs being pivotally joined to said armrests, respectively, a plurality of stopping projections, and a plurality of locking members located on said pair of pipes, respectively, said locking members being capable of locking said back legs in place; and
a U-shaped handle connected to said stroller body and having a plurality of stopping members capable of being engaged with said stopping projections of the stroller body, wherein
said U-shaped handle is capable of being turned relative to said stroller body and set at either a back position on a back side of said stroller body or a front position on a front side of said stroller body,
said stopping projections of said stroller body are positioned such that said stopping members of said U-shaped handle are engaged with said stopping projections when said U-shaped handle is set at the front position and is engaged with said stopping projections when said U-shaped handle is set at the back position, and
said stroller body and said U-shaped handle can be folded in three portions.

15. The stroller according to claim 14, further comprising
a folding canopy provided with a plurality of ribs, wherein
each of said ribs is provided with a pair of joints, and each of said ribs is capable of being folded in three portions at said joints.

16. The stroller according to claim 14, further comprising
a backrest attached to said stroller body, wherein
said backrest is provided with a plurality of joints, and said backrest can be folded in three portions at said joints.

17. The stroller according to claim 15, wherein
each of said ribs is joined pivotally to said stroller body.

18. The stroller according to claim 16, wherein
an inclination of said backrest is adjustable relative to said stroller body.

* * * * *